(12) United States Patent
Kraft

(10) Patent No.: US 7,019,629 B2
(45) Date of Patent: Mar. 28, 2006

(54) TIRE PRESSURE INDICATOR

(76) Inventor: David Kraft, 9676 Pavarotti Ter., #103, Boyton Beach, FL (US) 33437

( * ) Notice: Subject to any disclaimer, the term of this patent is extended or adjusted under 35 U.S.C. 154(b) by 210 days.

(21) Appl. No.: 10/655,180

(22) Filed: Sep. 4, 2003

(65) Prior Publication Data

US 2005/0062592 A1 Mar. 24, 2005

(51) Int. Cl.
*B60C 23/00* (2006.01)

(52) U.S. Cl. ............... 340/442; 340/448; 116/34 R; 152/152.1; 73/146

(58) Field of Classification Search ........ 340/442–448; 116/34 B, 34 A, 34 R; 152/152.1; 73/146
See application file for complete search history.

(56) References Cited

U.S. PATENT DOCUMENTS

| | | | | |
|---|---|---|---|---|
| 4,049,935 A | * | 9/1977 | Gruber | 200/83 P |
| 4,063,057 A | * | 12/1977 | Meisenheimer, Jr. | 200/83 Y |
| 4,726,223 A | * | 2/1988 | Huang | 73/146.8 |
| 4,954,806 A | * | 9/1990 | Hwang | 340/442 |
| 5,025,244 A | * | 6/1991 | Huang | 340/442 |
| 5,163,320 A | * | 11/1992 | Goshima et al. | 73/146.5 |
| 5,635,691 A | * | 6/1997 | Ballyns | 200/61.25 |
| 6,531,960 B1 | * | 3/2003 | Gladstone et al. | 340/442 |

* cited by examiner

*Primary Examiner*—Daniel Wu
*Assistant Examiner*—Son Tang
(74) *Attorney, Agent, or Firm*—Seyfarth Shaw LLP

(57) ABSTRACT

A tire pressure indicator is disclosed including a housing having an inlet for air under pressure, a sealed chamber, the chamber containing a gas under pressure, a signaling device having an electrical power source arranged to generate an electrical signal indicative of a pressure difference between the inlet and the chamber, a flexible diaphragm separating the inlet and the chamber, the diaphragm positioned to extend into the chamber as pressure at the inlet increases, a connector operatively engaging the diaphragm and the signaling device to actuate the signaling device to generate the electrical signal, and a light source coupled to the signaling device to receive the electrical signal and generate a visual signal indicative of a pressure difference between the inlet and the chamber.

2 Claims, 2 Drawing Sheets

TIRE PRESSURE INDICATOR

TECHNICAL FIELD

This invention relates generally to pressure indicating devices. In particular, the present invention relates to pressure indicating devices for indicating vehicle tire pressure.

BACKGROUND OF THE INVENTION

A wide variety of pressure indicating devices have been known for some time, the majority being devices that provide a means to accurately measure pressure, particularly of gases and liquids.

In certain situations, a precise measurement of pressure is not required but rather a simple and clear indication of a change in pressure is desired, for example to detect leakage from a pressurized container. In such situations, a device that provides a highly visual "see-at-a-glance" indication that leakage is occurring is more appropriate than a precise numerical measurement of the pressure within the container.

Such devices are well known in the art. For example, a device is known for indicating whether a pneumatic circuit is pressurized, available under the trademark ROTOWINK (ex Norgren Martonair Limited). This device is adapted to be mounted on a control panel, with the inlet connected to part of a pneumatic circuit, e.g. a pressure vessel, such as a compressor reservoir. The device contains a flexible, impermeable diaphragm that spans the inlet. The diaphragm supports a spring returnable piston.

A rod and crank arrangement extends from the piston, terminating in the head of the device, remote from the inlet, where the rod is attached to a crank within a rotatable ball having its opposite halves different colors, e.g. red and green. The ball is mounted beneath a lens through which one side of the ball is clearly visible from the exterior of the device.

A difference in pressure across the diaphragm, e.g. resulting from a build up of air pressure in a compression chamber to which the inlet of the device is connected, causes the diaphragm to flex towards the head of the device, which pushes the piston and rod towards the head. This movement causes the crank to cause the ball to rotate such that the other side of the ball is then visible through the lens. This other ball side of contrasting color provides a clear visual signal that pressure has built up in the chamber.

It is highly desirable for vehicle tires to remain at their optimum pressure for reasons of safety, fuel economy and comfort and to prolong the life of the tires. Consequently, it is preferable that tire pressures are checked at regular intervals. However, this mundane task is frequently overlooked since a lower than optimal tire pressure, such as caused by a slow puncture or an inaccurate gauge on a pump or compressed air supply unit, is only perceived when the tire looks dangerously flat and/or the vehicle feels uncomfortable, at which stage the tire pressure is well below its optimum. Clearly, in the period between initial loss of air pressure and detection, any use of the vehicle reduces the life of the tire significantly and will have put the driver and passengers of the vehicle at some risk.

Although it occurs less often, it is also potentially dangerous to drive a vehicle with one or more of its tires grossly over inflated rather than under inflated.

As evidence of the long-felt need of the motoring public for a solution to these problems, one need only review the number of patents claiming to address this expensive and potentially dangerous situation. Numerous devices have been proposed and patented for providing a continuous and visible indication of tire operating pressure. Most of the prior art designs either replace the standard tire valve stem or are a replacement for the original valve cap (utilizing the existing standard valve stem). Given that the vast majority of car or truck owners would more readily replace a tire valve cap than a tire valve stem, attention will be directed towards the former. A partial list of United States Patents for devices for monitoring tire pressure is: U.S. Pat. Nos. 5,641,902; 5,569,849; 5,557,256; 5,115,832; 5,007,365; 4,819,686; 4,606,391; 4,464,929; 4,174,673; 4,116,157, 4,103,549, and 3,889,530.

In response to the numerous disadvantages of the prior art, the present invention is disclosed incorporating new and novel visual indication features.

SUMMARY OF THE INVENTION

The present invention eliminates the above-mentioned needs for a tire pressure indicator by providing a tire pressure indicator including a housing having an inlet for air under pressure, a sealed chamber, the chamber containing a gas under pressure, a signaling device having an electrical power source arranged to generate an electrical signal indicative of a pressure difference between the inlet and the chamber, a flexible diaphragm separating the inlet and the chamber, the diaphragm positioned to extend into the chamber as pressure at the inlet increases, a connector operatively engaging the diaphragm and the signaling device to actuate the signaling device to generate the electrical signal, and a light source coupled to the signaling device to receive the electrical signal and generate a visual signal indicative of a pressure difference between the inlet and the chamber.

The present invention is additionally directed to a tire pressure indicator including a signaling device having a solar-powered electrical power source arranged to generate an electrical signal indicative of a pressure difference between the inlet and the chamber.

DETAILED DESCRIPTION OF THE PREFERRED EMBODIMENT

Figure 1:
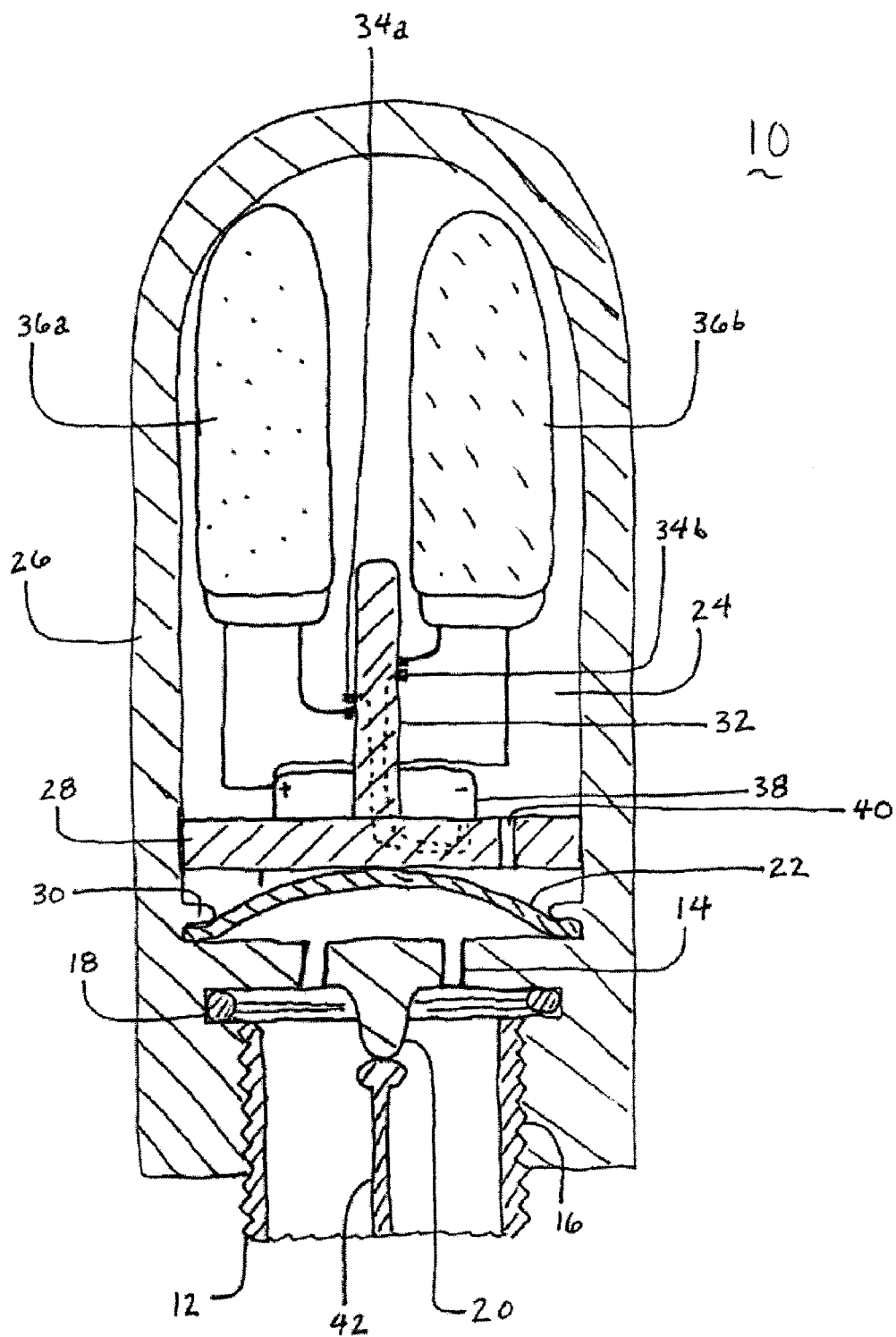
FIG. 1 is a side view of the preferred embodiment of the present invention.

Referring now to FIG. 1, the preferred embodiment of the present invention is illustrated as tire pressure indicator 10. Tire pressure warning device 10 includes a generally cylindrical casing 26, is mounted onto a vehicle tire valve by screw threading on to the valve housing 12. A nose 20 at the end of a threaded bore 16 in casing 26 of device 10 depresses central pin 42 of valve 12. An O-ring 18 ensures a sealed contact between device 10 and valve housing 12. Depressing pin 42 allows pressurized air from the tire to enter, via ports 14, space between nose 20 and a flexible diaphragm 22 sealed to casing 26.

Flexible diaphragm 22 spans the inlet and is held in position by a flange 30 on the inner wall of casing 26.

Within casing 26, a chamber 24 above diaphragm 22 as is shown in the drawings is pressurized and is completely permanently hermetically sealed during the manufacture of device 10. Chamber 24 contains a piston 28 positioned adjacent to diaphragm 22. Additionally, piston 28 has a perforation bore 40 to ensure that the pressure is equal on each side of the piston. As diaphragm 22 rises under increased pressure, thus indicating an increased tire pressure, piston 28 rises correspondingly. As piston 28 rises, a piston rod 32 raises containing electrical contacts 34*a* and 34*b*. Electrical contacts 34*a* and 34*b* are connected to a power source 38, itself electrically connected to lights 36*a* and 36*b*. Lights 36*a* and 36*b* illuminate differently from one another, such as with different colors, so as to indicate at least two different pressure conditions, i.e. low pressure or high pressure. As illustrated in the figures, the raising or lowering of piston rod 32 permits connector 34*a* or 34*b* to contact the open connector of either light 36*a* or 36*b*, respectively. Once connector 34*a* or 34*b* contacts the open connector either light 36*a* or 36*b*, respectively, light 36*a* or 36*b* is illuminated, thus indicating a pressure condition.

Figure 2:
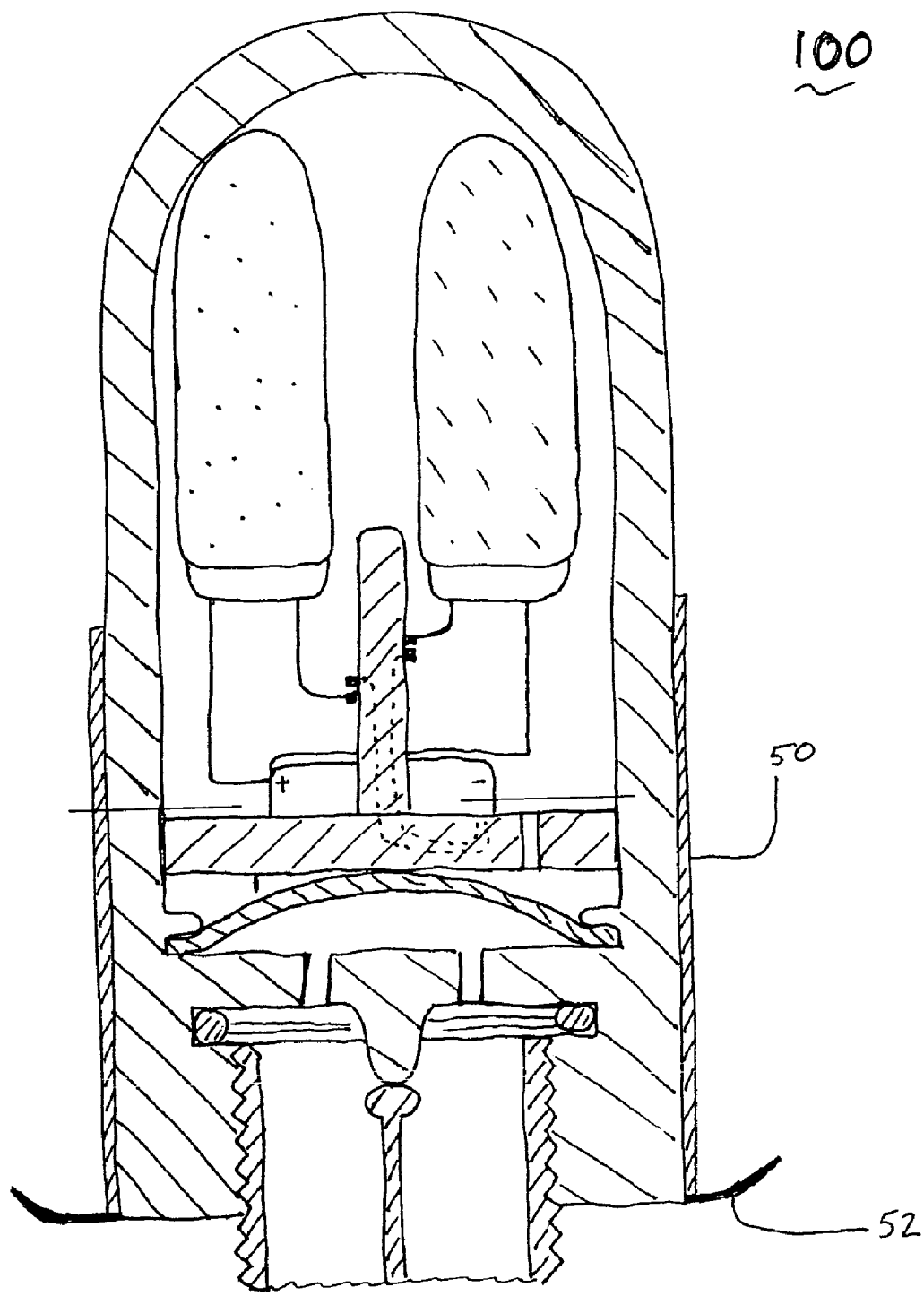
FIG. 2 is a side view of an alternative embodiment of the present invention of FIG. 1.

Referring now to FIG. 2, an alternative embodiment of the present invention is illustrated as tire pressure indicator 100. In this embodiment, solar cells 50 are provided about casing 26 so as to provide electrical energy to recharge power source 38. Casing 26 can be further provided with reflectors 52 to reflect light to solar cells 50.

Although only a few exemplary embodiments of the present invention have been described in detail above, those skilled in the art will readily appreciate that numerous modifications are to the exemplary embodiments are possible without materially departing from the novel teachings and advantages of this invention. Accordingly, all such modifications are intended to be included within the scope of this invention as defined in the accompanying claims.

What is claimed is:

1. A tire pressure indicator comprising:
   a housing having an inlet for air under pressure;
   a sealed chamber, said chamber containing a gas under pressure;
   a signaling device having an electrical power source arranged to generate an electrical signal indicative of a pressure difference between said inlet and said chamber;
   a flexible diaphragm separating said inlet and said chamber, said diaphragm positioned to extend into said chamber as pressure at said inlet increases;
   a connector operatively engaging said diaphragm and said signaling device to actuate said signaling device to generate said electrical signal;
   a light source coupled to said signaling device to receive said electrical signal and generate a visual signal indicative of a pressure difference between said inlet and said chamber; and
   wherein said visual signal indicates a low pressure or a high pressure difference between said inlet and said chamber.

2. The tire pressure indicator according to claim 1 wherein said electrical power source is solar-powered.

* * * * *